United States Patent [19]

Sharpe

[11] 4,186,616
[45] Feb. 5, 1980

[54] VARIABLE SPEED TRANSMISSION SYSTEMS

[75] Inventor: Raymond Sharpe, Mirfield, England

[73] Assignee: Lucas Industries Limited, Birmingham, England

[21] Appl. No.: 824,249

[22] Filed: Aug. 12, 1977
(Under 37 CFR 1.47)

[30] Foreign Application Priority Data

Aug. 14, 1976 [GB] United Kingdom ............... 33905/76

[51] Int. Cl.² ............................................. F16H 15/08
[52] U.S. Cl. ..................................................... 74/200
[58] Field of Search ................. 74/190, 198, 199, 200, 74/201, 208

[56] References Cited

U.S. PATENT DOCUMENTS

| | | | |
|---|---|---|---|
| 1,984,797 | 12/1934 | Hayes | 74/200 |
| 2,113,638 | 4/1938 | Almen | 74/200 |
| 3,413,864 | 12/1968 | Magill et al. | 74/200 |
| 3,430,504 | 3/1969 | Dickenbrock | 74/200 |
| 3,581,587 | 6/1971 | Dickenbrock | 74/200 |
| 3,802,284 | 4/1974 | Sharpe et al. | 74/200 |
| 3,823,613 | 7/1974 | Abbott | 74/200 |
| 3,826,147 | 7/1974 | Sharpe et al. | 74/200 |
| 3,826,148 | 7/1974 | Magill | 74/200 |
| 3,828,618 | 8/1974 | Sharpe et al. | 74/200 |

FOREIGN PATENT DOCUMENTS 2236589 2/1973 Fed. Rep. of Germany ............. 74/200
1395319 5/1975 United Kingdom ...................... 74/200

Primary Examiner—Samuel Scott
Assistant Examiner—Randall L. Green

[57] ABSTRACT

A transmission system comprising two axially spaced torus discs or rotors, one serving as an input and the other as an output, and between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus varying the drive ratio of the gear and means for moving each of the roller bearing structures generally tangentially with respect to the axis and arranged to apply a force to said structure in a direction to vary the castor angle, there being means for accommodating effective movement of the roller bearing axes relatively to the gear axis in a direction parallel to the gear axis.

7 Claims, 6 Drawing Figures

VARIABLE SPEED TRANSMISSION SYSTEMS

BACKGROUND AND SUMMARY OF THE INVENTION

This invention relates to variable ratio frictional drive gears of the kind comprising basically two axially spaces torus discs or rotors, one serving as an input and the other an output between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus, varying the drive ratio of the gear. The angle of tilt of the roller bearing structure as it controls the drive ratio of the gear, is called the ratio angle.

One way of changing the ratio angle is to provide means to apply a force to each of the roller bearing structures to move it generally tangentially with respect to the gear axis, and by allowing the rollers then to steer themselves towards a different ratio angle. The rollers are each mounted in their bearing structures in such a way that they are inclined at an angle to a plane perpendicular to the gear axis. This angle is called the caster angle. Gears of this general construction are referred to as gears with tangentially controlled roller bearing structures. Such a drive gear will for convenience herein be described as being of the kind specified.

This invention is particularly, though not exclusively, concerned with gears in which the plane of each roller, normal to the axis of rotation of the roller and passing through the points of contact of the roller with the two opposed torus discs, contains the axis about which the roller tilts, being tangential to the torus centre circle (i.e. the locus of the centre of the circle revolved to generate the torus) as distinct from gears in which the same plane for each roller is closer to the main axis of rotation of the gear.

The input must rotate in the direction in which it tends to drag each roller against the control force which controls the tangential position of the rollers. The caster angle must be such that each roller tilt axis is inclined away from the input disc in the direction of movement of the disc. This criterion arise out of the fact that stable operation at any given ratio angle occurs when the axis of rotation of each roller passes through the gear axis. Unless the caster angle is as just described, tangential displacement of a roller (by virtue of an increase or decrease in the load on the gear or in controlling fluid pressure) will result in the torus discs producing a steering force on the roller which will tilt the roller in the direction opposite to that which is required to move the roller axis back to intersect the gear axis, so that the roller will be moved away from, instead of towards, its new stable position.

In general, the larger the caster angle, the more stably the rollers tend to maintain their ratio angles and consequently the more reliably the apparatus operates. This is of particular importance when the apparatus is run at very high rotational speeds, perhaps up to 20,000 revolutions per minute, though there are operating conditions in which maximising the caster angle is not so important.

There have, in the past, been many attempts to achieve ease of adjustment of the rollers with reliable operation of the apparatus, that is with minimum wear and maximum power transmission from the input to the output, and while many of them are satisfactory, most have some short comings, being, particularly, not well suited for all operating conditions, though good in some.

It is the object of this invention to provide a transmission system of the kind specified in which provision exists for adjusting the caster angle in such a way as to achieve maximum efficiency of operation under the widest possible range of operating conditions.

According to the invention there is provided a transmission system of the kind specified wherein the means for moving each of the roller bearing structures to move it generally tangentially is arranged to apply a force to said structure, said force being in a direction to vary the caster angle there being means for accommodating effective movement of the roller bearing axes relatively to the gear axis, in a direction parallel to the gear axis.

The invention will now be described by way of example with reference to the accompanying drawings in which:

DESCRIPTION OF THE INVENTION

The transmission system is principally designed for use in driving aircraft accessories and in particular an alternator. The alternator is driven from an aircraft main engine but is required to be rotated at constant speed. The transmission is therefore designed for variable input speed, but constant output speed. It is however, to be understood that transmissions incorporating the invention as herein defined can be used in transmission of this sort with other operating characteristics including constant input and variable output speed and variable input as well as output speeds.

Figure 1:
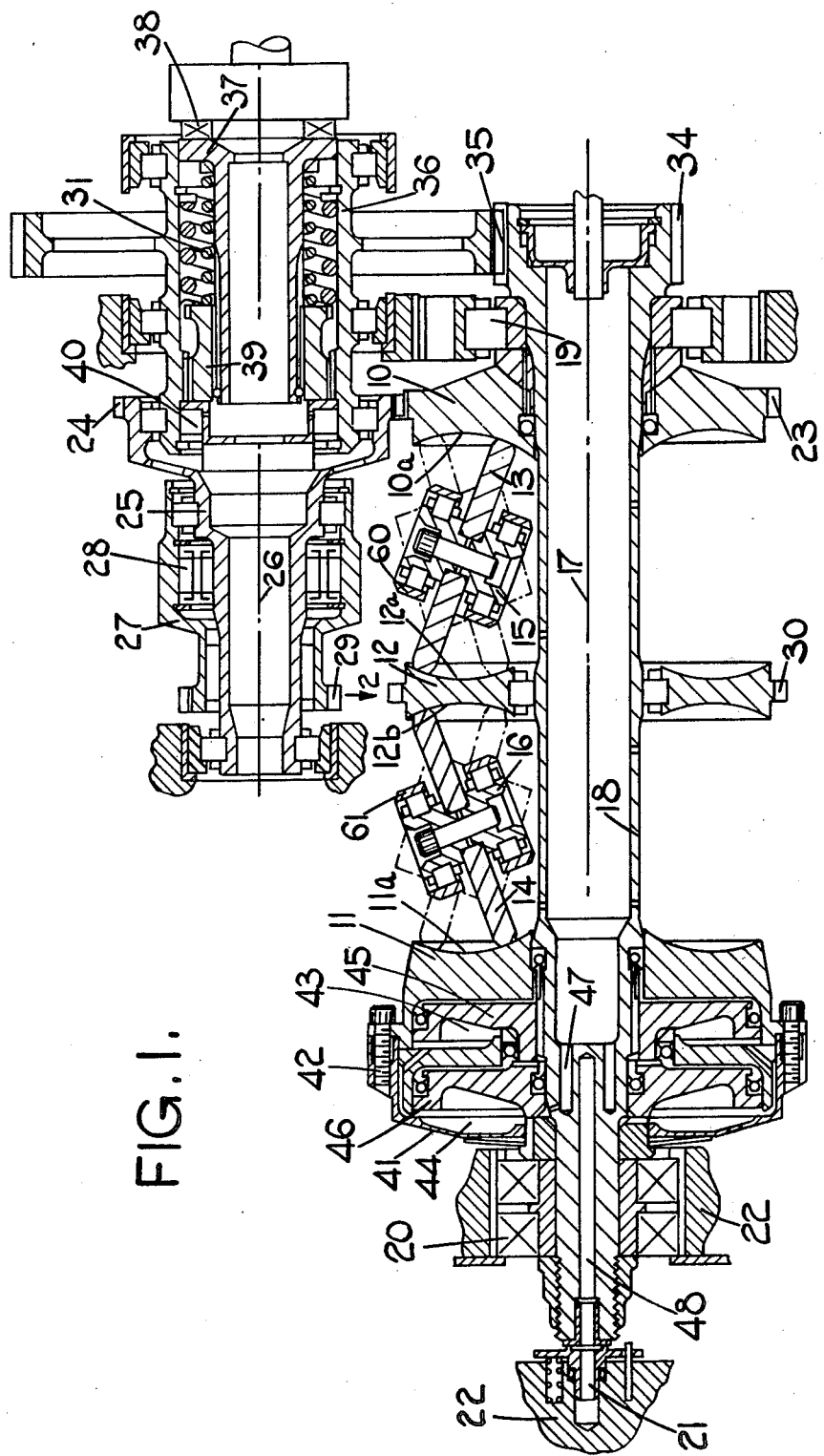
FIG. 1 is a cross-sectional view showing a transmission system constructed in accordance with the invention.

Referring first to FIG. 1, the general layout of the transmission is illustrated. The system includes a variable ratio drive unit having three rotors 10, 11, 12 which have respective part toroidal surfaces 10a, 11a, and 12a and 12b respectively. The rotor 12, is situated mid-way between the rotors 10 and 11, and is provided with its part toroidal surfaces 12a, 12b, on opposite axially presented sides thereof. The rotor 10 has its part toroidal surface 10a presented towards the surface 12a, and similarly the surface 11a of the rotor 11 is presented towards the surface 12b of the central rotor 12. The rotors 10, 11 are input rotors and the rotor 12 is an output rotor. However, the system will operate perfectly satisfactorily with the rotors 10, 11 as output and the input is the rotor 12. Situated between the rotors 10, 12 and 11, 12 are respective sets of flat rollers 13, 14. These are rotatable in a manner which will be described and are for this purpose carried in respective bearings 15, 16. The rollers are shown in FIG. 1 in positions in which they engage the respective surfaces 10a, 12a and 11a, 12b, at different distances from the axis of rotation of the rotors 10, 11, 12. Such axis is identified at 17. The rotors 10, 11 are carried non-rotatably upon a hollow shaft 18. This is supported on suitable fixed structure 22 by means of bearings 19, 20 situated near its opposite ends respectively.

The input rotor 10 has on its external periphery, gear teeth 23, engaging with a gear ring 24, on a hollow stepped shaft 25. This hollow stepped shaft is mounted for rotation about an axis 26, parallel with the axis 17. Connecting the hollow stepped shaft 25, with a surrounding sleeve 27, is a clutch 28. The sleeve 27, has gear teeth 29, meshing with a gear (not shown) which drives auxiliary equipment which forms no part of this invention.

The output rotor 12 has external gear teeth 30 and this represents the output of the drive unit.

Driving the shaft 18, through gear teeth 34, thereon is a gear wheel 35, which is carried on a further hollow sleeve 36. Between the sleeve 36, and an input shaft 37, with, at one end, dogs 38, is a coupling incorporating an intermediate slidable sleeve 39, and an element 40, which is arranged to melt and allow the sleeve 39 and hence the shaft 37 to move under the influence of springs 31 in the event of this part of the system reaching a temperature in excess of a predetermined value, to disconnect the input drive from the system. This forms the subject of co-pending Patent Application No. 33909/76.

To load the rotors 10, 11, 12 and the rollers 13, 14 so as to maintain frictional contact between them, there is an end load device within a housing 41, secured by screws 42, to the rotor 11, at the side thereof remote from its part toroidal surface 11a. Defined within the space between the rotor 11, and the housing 41, are cavities 43, 44 for hydraulic fluid. Within the cavities are respective pistons 45, 46 mounted on the shaft 18. In the end of the shaft 18 is a rotary fluid joint 21 engaged in the fixed structure 22. Furthermore in this end of the shaft 18, are drillings 47, 48 for supply and exhaust of fluid to the cavities 43, 44. The passage 48 communicates with the joint 21 for supplying high pressure fluid fed at one side of each of the pistons 45 and 46. At the other side of the pistons 45 and 46 lower fluid pressure is fed from one of the two drillings 47 which are symmetrical for balance of the shaft. This end load device is the subject of co-pending British Patent Application No. 33906/76.

Figure 2:
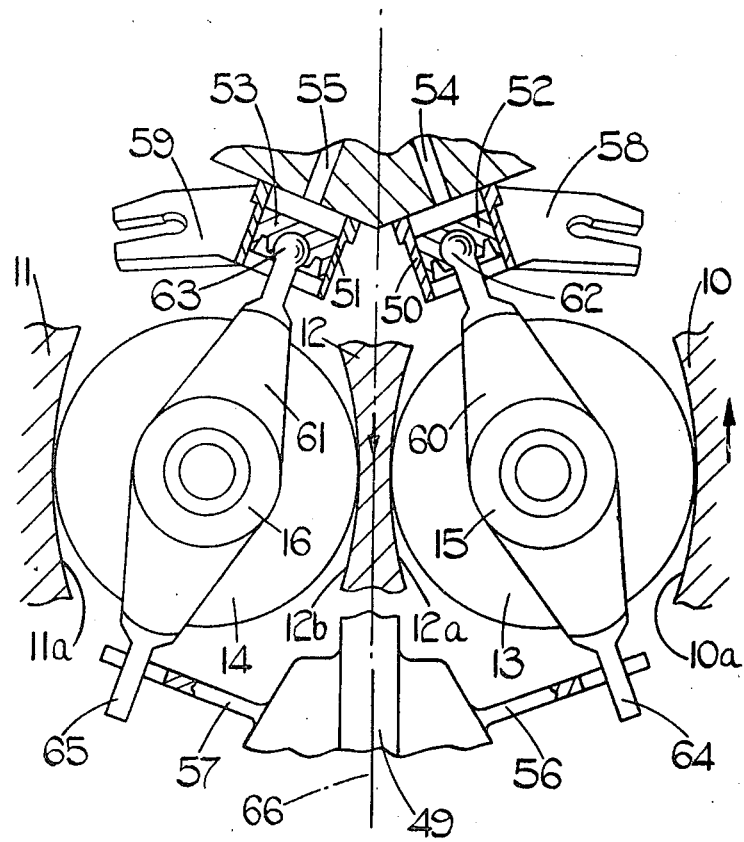
FIG. 2 is an enlarged view of the rotors and rollers as seen in the direction of the arrow 2 in FIG. 1 and partly in cross-section.

FIG. 2 shows on an enlarged scale portions of the rotors 10, 11 and 12, and their respective surfaces 10a, 11a, 12a and 12b. Also illustrated are two rollers 13 and 14. It is, however, to be understood that there are, in this example, three sets of the rollers 13, 14 each roller arranged as will be described and in each set being equally spaced apart by 120 degrees.

The bearings 15, 16 are carried in bearing structures 60, 61 which are mounted in a portion 49 of the fixed structure 22 of the system. In FIG. 2 is shown one pair of rollers controlled by respective control cylinders 50, 51 mounted in the portion 49. Each control cylinder contains a piston 52, 53, and has hydraulic supply passages indicated generally at 54, and 55 in the portion 49.

The hydraulic supply is the same as that in the rotary joint 21 leading to the end loading device adjacent to the rotor 11.

The portion 49, also carries forked arms, two pairs of which are indicated in the drawing by numerals 56, 57, 58 and 59. The forked arms 56, 57 are associated with the control cylinders 50 and 51 respectively, to control the rollers 13, and 14 respectively, as will be described. The forked arms 58 and 59, however, are each associated with another pair of the rollers (which are not illustrated).

The roller bearings 15, 16 are as previously described, mounted in bearing supports 60, 61 respectively. One end of each support structure 60, 61 is provided with a spherical end 62, 63, engaging in the piston 52, 53 respectively. The other end of each support 60, 61 has a cylindrical spigot 64, 65 extending lengthwise of the bearing support and engaging in the fork of the forked arm 56, 57 respectively.

In operation of this transmission system, with variable speed input the system automatically compensates for input speed change, this being achieved through the alteration in the ratio angle of the rollers to provide constant speed at the output. The inclination of the rollers as seen in FIG. 1, regulates the ratio of the speed of the input rotors 10, 11 to the speed of the output rotor 12. As illustrated in full lines, rotation of the input rotors 10, 11 at a given speed will cause rotation of the output rotor 12, at a slower speed than said given speed. As indicated in dotted lines the opposite ratio characteristic can be achieved if the point of contact between the rollers on the input rotors 10, 11 is outside that on the surfaces 12a, 12b of the output rotor 12. If, however, the rollers engage the surfaces 10a, 11a, 12a, and 12b at the same radial distance on each such surface from the axis 17 of the shaft 18, the input and output rollers 10, 11, 12 will all rotate at the same speed. This represents a drive ratio of 1:1 between the input and the output of the system.

It is, however, necessary for stable running that the axis of each of the rollers 13, 14 must intersect the gear axis 17 which is the axis of the shaft 18. To change the ratio the rollers are moved tangentially and they will then steer to new ratio angle positions in which they are again stable, that is where they intersect with the gear axis as specified above. To achieve the ratio change the control cylinders 50, 51 containing their pistons 52, 53 are actuated. These are shown in FIG. 2 to be arranged to move the bearing supports 60, 61 in general directions which are non-parallel or inclined at acute angles with respect to a plane indicated at 66, which is perpendicular to the gear axis 17, the latter being the axis of rotation of the shaft 18, and of the rotors 10, 11, 12. The inclination of the axes of the pistons and cylinders 52, 50 and 53, 51 are opposite to one another in each adjacent pair, as indicated in FIG. 2. Actuation of these pistons and control cylinders therefore move the axes of the rollers 13, 14, in directions which are substantially tangential with respect to the points of contact of the rollers, with the respective part toroidal surfaces 10a, 11a, 12a and 12b. Such generally tangential movement of the rollers is accompanied by steering of the rollers about the centres of the spherical ends 62, 63 in order that the rollers may take up positions in which their rotational axes again intersect with the axis 17. It is, however, necessary to provide for change in the positions of the roller axes in a direction lengthwise of the axis 17, and this is accomplished by movement of the spigots 64, 65, in the forked arms 56, 57 respectively. The spigots 64,65 are furthermore of cylindrical form so that, with the spherical ends, they permit angular movement of the bearing supports 60, 61 with respect to said arms. In making such provision for movement of the bearing structures in direction lengthwise of the axis 17, the inclination of the bearing supports with respect to the plane 66, changes. This inclination is the caster angle and consequently the caster angle will change as the ratio of speeds between the input and output rotors change.

Preferably, the higher the rotational speed induced in the output rotor 12, the greater the caster angle should be, for improved stability in the system at high rotational speeds which may be of the order of 20,000 revolutions per minute.

Figure 3:
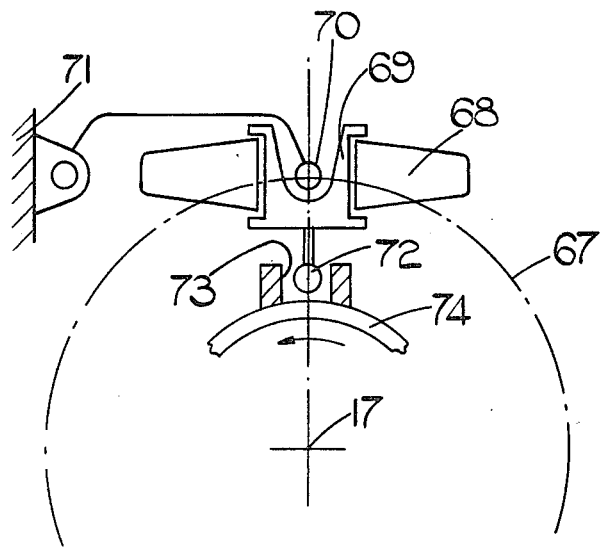
FIG. 3 is a diagrammatic representation of a roller in an alternative construction with its associated control means.
Figure 4:
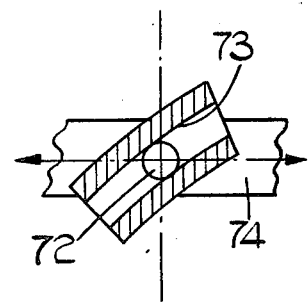
FIG. 4 is a fragmentary view of part of the control means of the construction shown in FIG. 3.

In the alternative construction shown in FIGS. 3 and 4 the central axis 17 of the transmission is shown. The apparatus shown in FIGS. 3 and 4 is substantially the same as that in the FIGS. 1 and 2 construction, though many of the components, including the rotors, are omitted for clarity. Shown by the dotted line 67 is the path of contact of a roller 68 on one of the part toroidal surfaces. The roller is mounted for rotation on its bearing 69, which in turn is carried on the bearing support which is movable angularly about the axis indicated at 70 on the fixed structure 71.

Connected to the bearing support for the bearing 69 is a cam follower 72. Alternatively, this may be carried on the roller itself. This cam follower 72 engages in a cam track 73, the cam follower and track being also shown in FIG. 4. The cam track is on a ring 74, which is movable about the axis 17 in either of two opposite directions from the position shown. As shown the roller occupies a position to produce 1:1 drive between the input and output rotors 10, 11 and 12.

In this example, the track 73 is arcuate. As the cam follower 72 moves along the cam track, the roller 68 is tilted to vary the effective caster angle, as defined above in relation to the construction shown in FIGS. 1 and 2. The caster angle furthermore preferably varies to a maximum for conditions in which maximum relative speeds between the rotors are existing, since this improves stability of the rollers on the part toroidal surfaces. The ring 74 is rotatably mounted on the structure for affecting adjustment.

Figure 5:
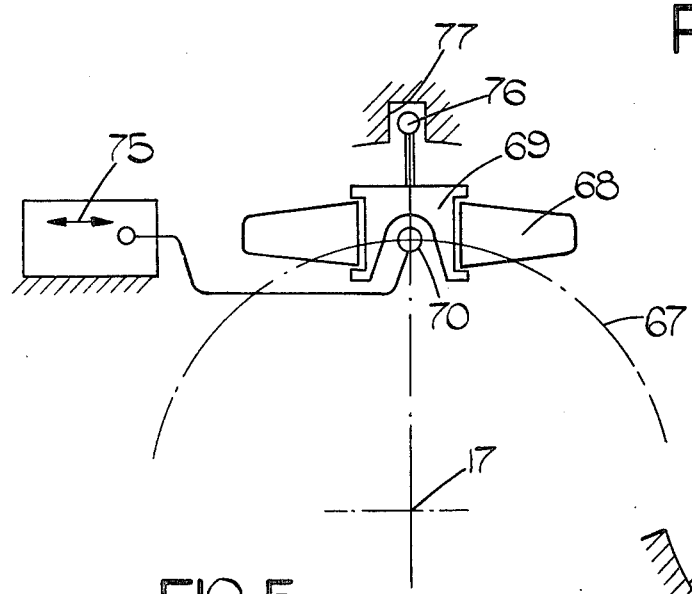
FIG. 5 is a diagrammatic view of a roller in a further alternative construction showing the control means.
Figure 6:
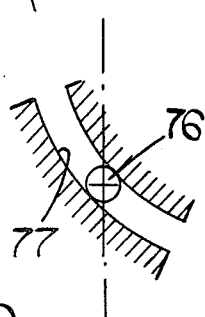
FIG. 6 is a fragmentary view of the control means in the construction of FIG. 5.

A similar construction is shown in FIG. 5 except that the roller bearing 69, is inverted and the axis at 70 is adjustable by the control means in the direction indicated by the arrow 75, that is substantially tangentially with respect to the path 67 of contact between the roller and the part toroidal rotor surface. The bearing 69 or the bearing support or the roller axle is furthermore connected to a cam follower 76, which runs in a cam track 77, in the fixed structure of the system. The fixed structure, with the cam track 77, and the cam follower 76, are also shown in FIG. 6. This system works in a manner similar to that of FIGS. 3 and 4, but the cam track 77, is arranged to control the cam follower in the opposite sense to that of the FIGS. 3 and 4 construction.

In an alternative construction the cylinders 51,52 are swivelable in the fixed structure to provide for steering of the rollers when an adjustment has been initiated. In this example the piston rods spherical connection with the spherical ends of the bearing supports are replaced by rigid connection.

I claim:

1. A transmission system comprising two axially spaced rotatable torous discs rotatable about a common gear axis, part toroidal surfaces on the respective axially presented faces of the discs respectively, an input connected to one of the discs, an output connected to the other of the discs, a set of circumferentially spaced drive rollers in frictional rolling contact with the part toroidal surfaces on said discs respectively, bearing structures in which said rollers are mounted respectively, each of the bearing structures being tiltable through a ratio angle about an axis at right angles to an axis of rotation of each roller to vary the distances from the common gear axis of the discs at which the rollers engage the two toroidal surfaces of the discs respectively, means for moving the roller bearing structures generally tangentially with respect to the common gear axis of the discs, said means adapted for applying a force to said structures in a direction to vary a caster angle which is the angle of inclination of each roller with respect to a plane perpendicular to said common gear axis, and means for accommodating movement of the roller bearing axes relatively to said common gear axis of the discs, in a direction parallel with said common gear axis.

2. A transmission system as claimed in claim 1 in which the means for moving each of the roller bearing structures generally tangentially is a respective piston and cylinder unit.

3. A transmission system as claimed in claim 1 in which the means for accommodating movement of the roller bearing axes is a guide means connected to the roller bearing structure.

4. A transmission system as claimed in claim 3 in which the guide means is a cam and cam follower combination.

5. A transmission system as claimed in claim 4 in which the cam is a curved track and the cam follower is carried by the bearing structure.

6. A transmission systems as claimed in claim 4 in which the cam is on a member forming a rotationally movable portion of the system.

7. A transmission system as claimed in claim 5 in which the cam is on a fixed portion of the system.

* * * * *

UNITED STATES PATENT AND TRADEMARK OFFICE
CERTIFICATE OF CORRECTION

PATENT NO. : 4,186,616

DATED : February 5, 1980

INVENTOR(S) : Raymond Sharpe

It is certified that error appears in the above-identified patent and that said Letters Patent are hereby corrected as shown below:

Column 1, line 8, "spaces" should be --spaced--.

Signed and Sealed this

Ninth Day of September 1980

[SEAL]

Attest:

*Attesting Officer*

SIDNEY A. DIAMOND

*Commissioner of Patents and Trademarks*